US009732786B2

(12) United States Patent
Trotter et al.

(10) Patent No.: US 9,732,786 B2
(45) Date of Patent: Aug. 15, 2017

(54) ADJUSTABLE LINKING ARM ASSEMBLY

(71) Applicant: ILLINOIS TOOL WORKS INC., Glenview, IL (US)

(72) Inventors: Jason K. Trotter, Des Plaines, IL (US); Robert K. Dutzi, Palatine, IL (US); Dennis M. Mark, Buffalo Grove, IL (US); Paul F. Donovan, Brodhead, WI (US); Jacob J. Domagalla, Peotone, IL (US); Kevin J. Szymanski, Norridge, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/767,613

(22) PCT Filed: Feb. 8, 2014

(86) PCT No.: PCT/US2014/015448
§ 371 (c)(1),
(2) Date: Aug. 13, 2015

(87) PCT Pub. No.: WO2014/130272
PCT Pub. Date: Aug. 28, 2014

(65) Prior Publication Data
US 2016/0003290 A1 Jan. 7, 2016

Related U.S. Application Data

(60) Provisional application No. 61/766,985, filed on Feb. 20, 2013.

(51) Int. Cl.
*F16C 7/06* (2006.01)
*B60G 7/00* (2006.01)
(Continued)

(52) U.S. Cl.
CPC ............... *F16C 7/06* (2013.01); *B60G 7/003* (2013.01); *B60G 7/005* (2013.01);
(Continued)

(58) Field of Classification Search
CPC .......... B60G 7/00; B60G 7/003; B60G 7/005; B60G 2204/416; B60G 2206/111;
(Continued)

(56) References Cited

U.S. PATENT DOCUMENTS

| | | | | |
|---|---|---|---|---|
| 1,742,782 A * | 1/1930 | Parker | ...................... | B62D 7/16 403/74 |
| 1,930,676 A * | 10/1933 | Farr | ......................... | B62D 7/16 403/355 |
| 1,983,947 A * | 12/1934 | Rockwell | ................. | B62D 7/16 105/22 |
| 3,498,652 A | 3/1970 | Cass | | |
| 5,529,316 A * | 6/1996 | Mattila | .................. | B62D 17/00 280/93.51 |
| 6,074,125 A | 6/2000 | Krawczak | | |
| 6,398,446 B1 * | 6/2002 | Pazdirek | ................ | B60G 7/001 403/122 |
| 8,061,921 B2 * | 11/2011 | Seol | .................... | F16C 11/0638 403/124 |

(Continued)

FOREIGN PATENT DOCUMENTS

DE 2814995 A1 10/1979
DE 102010041791 A1 * 4/2012 ............. B60G 7/001
(Continued)

OTHER PUBLICATIONS

Machine Translation of DE 102010041791, https://worldwide.espacenet.com, generated Jun. 22, 2016.*
ISR and WO for PCT/US2014/015448 mailed Mar. 18, 2014.

*Primary Examiner* — Daniel Wiley
(74) *Attorney, Agent, or Firm* — Paul F. Donovan

(57) ABSTRACT

A linking arm assembly adapted to receive and retain a ball stud. The assembly includes an elongated rod structure and a socket head and is variable over a range of lengths by adjustment of the relative position of the elongated rod structure and the socket head. Linking arm assemblies consistent with the present disclosure may be adjusted for use in different applications while using common components.

11 Claims, 10 Drawing Sheets

(51) Int. Cl.
    *F16B 7/10*        (2006.01)
    *F16C 11/06*       (2006.01)

(52) U.S. Cl.
    CPC .... *F16C 11/0657* (2013.01); *B60G 2204/416* (2013.01); *B60G 2206/111* (2013.01); *B60G 2206/1112* (2013.01); *F16B 7/105* (2013.01); *F16C 11/0623* (2013.01); *F16C 2300/02* (2013.01); *F16C 2326/05* (2013.01)

(58) Field of Classification Search
    CPC ... F16C 11/0657; F16C 11/06; F16C 11/0623; F16C 11/0695; F16C 11/069; F16C 11/0619; F16C 11/0609; F16C 11/0642; F16C 7/02; F16C 7/06; F16C 7/182; B62D 7/16; B62D 7/20; Y10T 403/32631; Y10T 403/32721
    See application file for complete search history.

(56) References Cited

U.S. PATENT DOCUMENTS

| | | | | |
|---|---|---|---|---|
| 8,870,201 | B2* | 10/2014 | Kuroda | B60G 21/055 280/93.511 |
| 9,227,661 | B2* | 1/2016 | Seibert | B62D 7/20 |
| 2009/0140506 | A1 | 6/2009 | Fischer et al. | |

FOREIGN PATENT DOCUMENTS

| | | | |
|---|---|---|---|
| GB | 2344400 | A | 6/2000 |
| JP | 10159818 | A | 6/1998 |
| JP | 11093997 | A | 4/1999 |

* cited by examiner

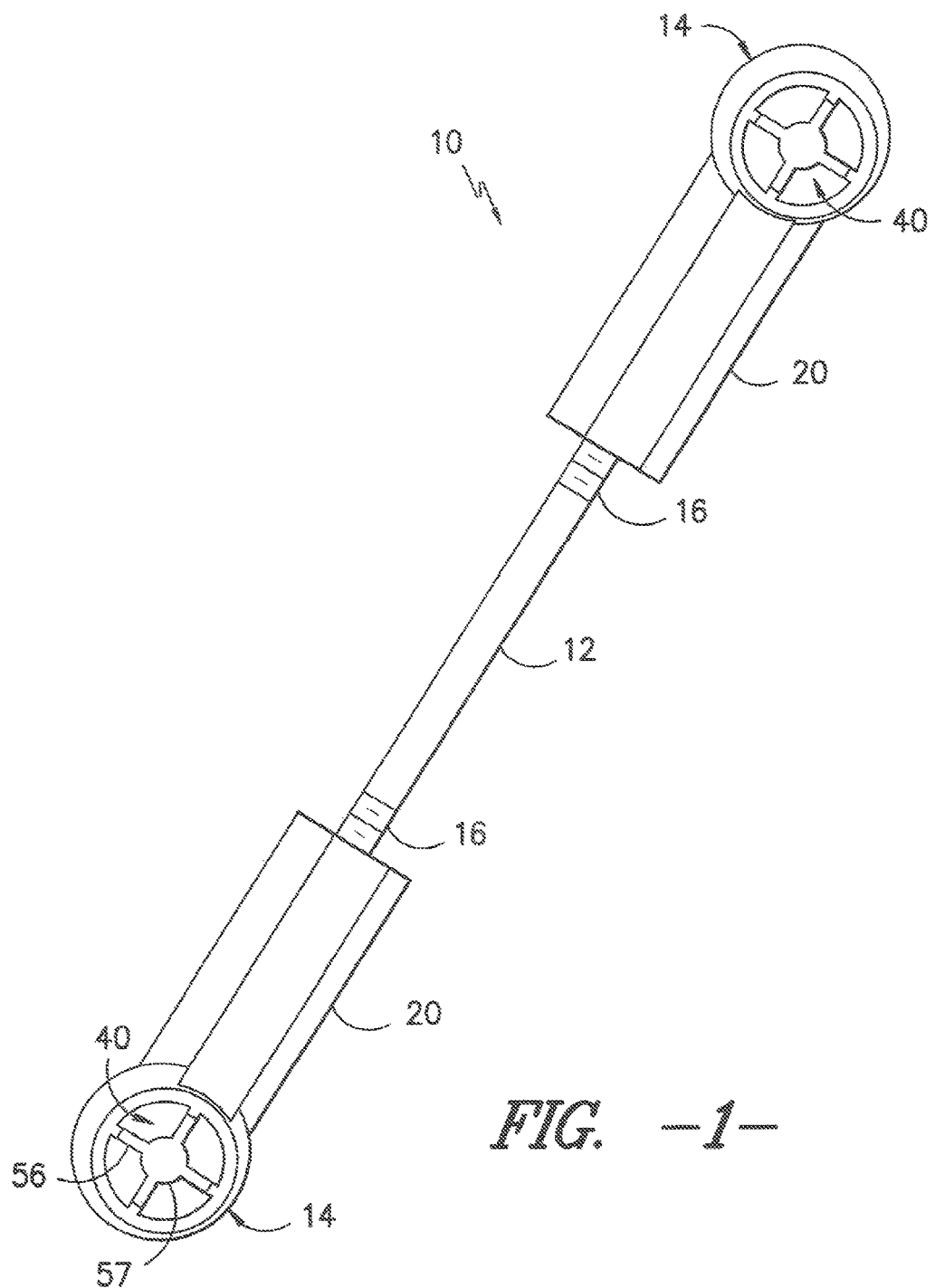
FIG. -1-

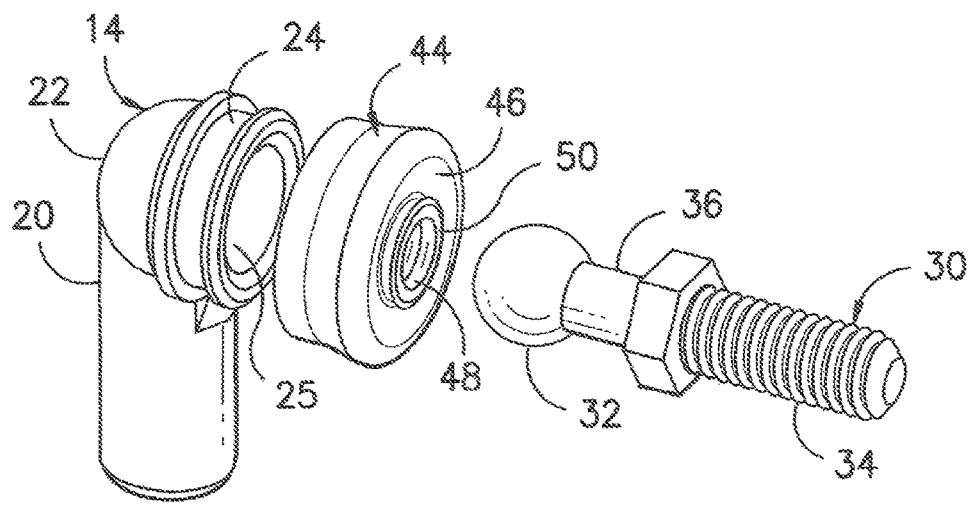
FIG. -2-
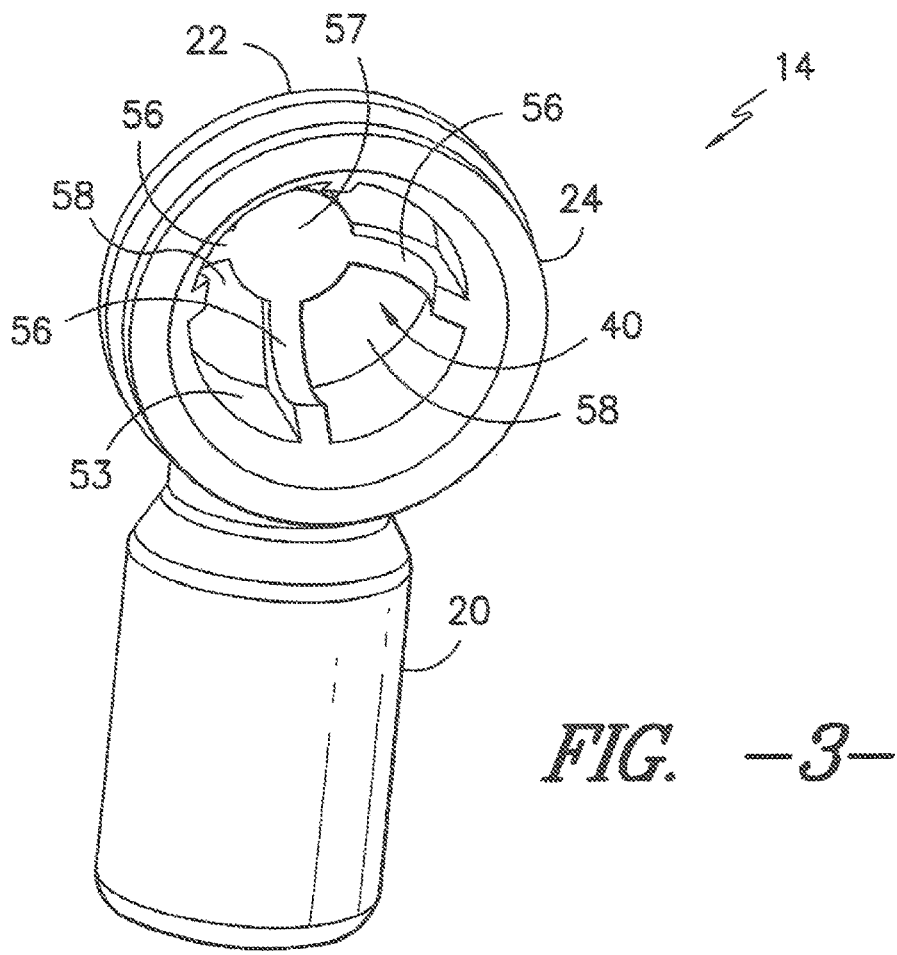
FIG. -3-

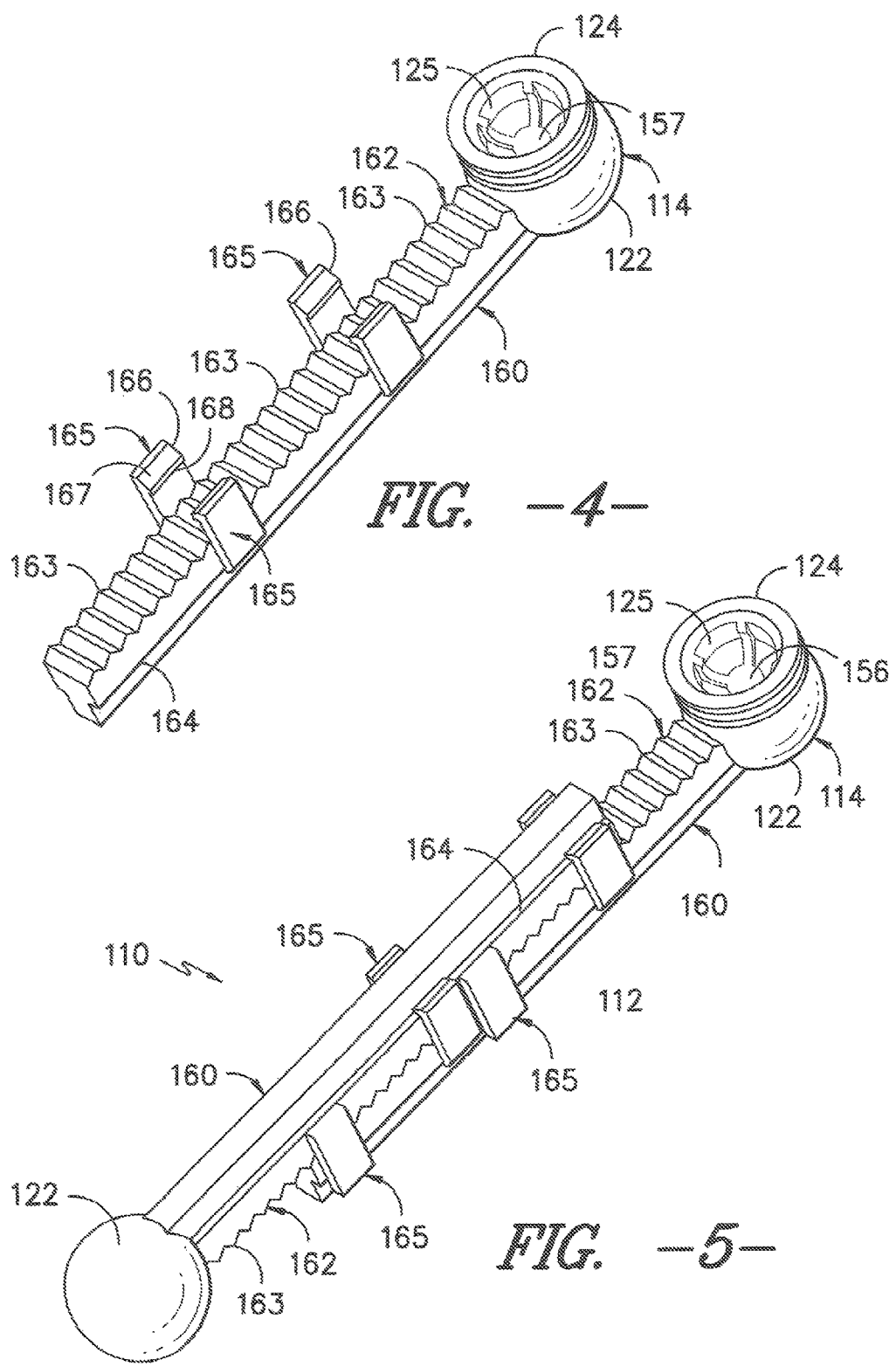

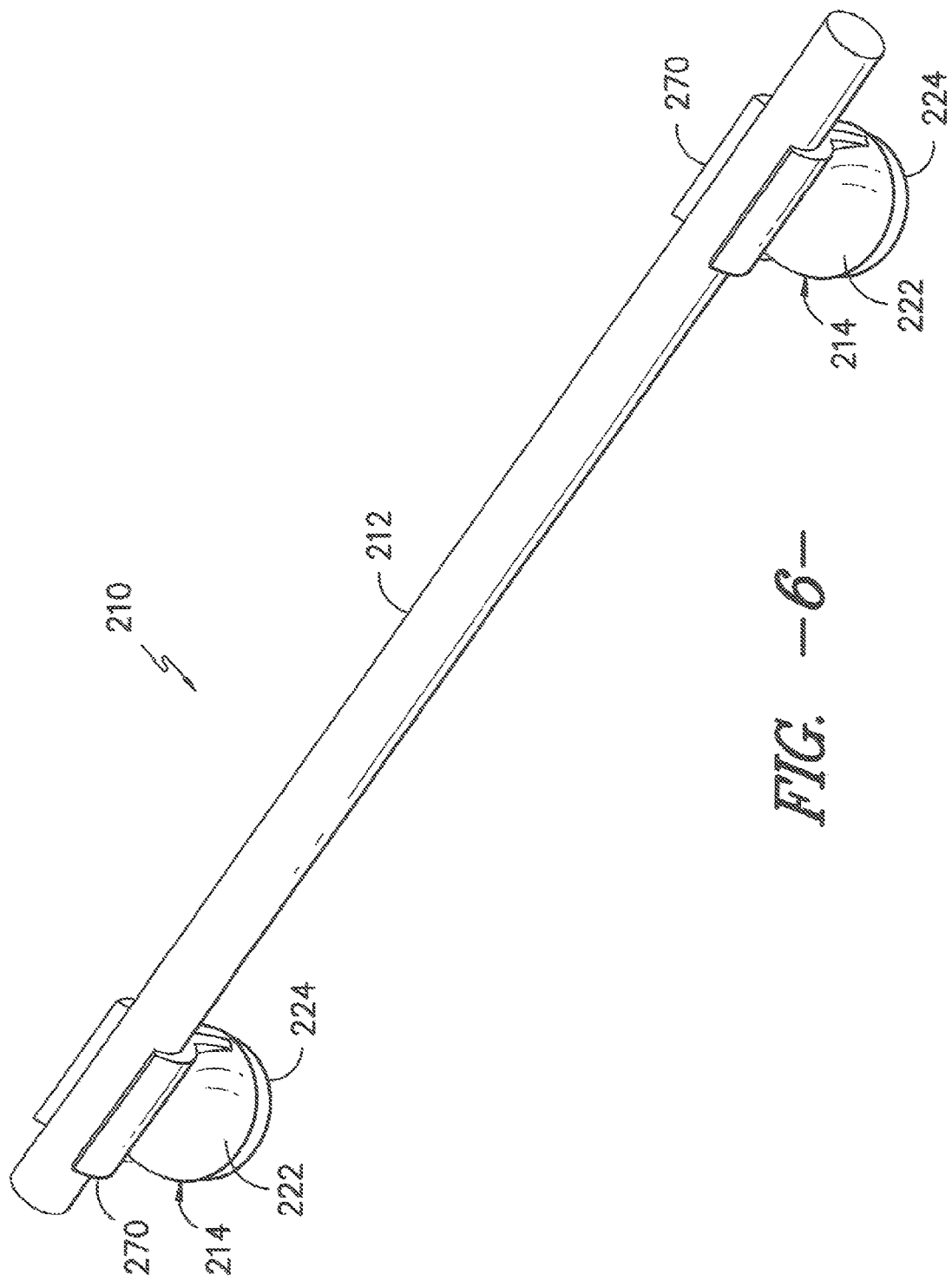

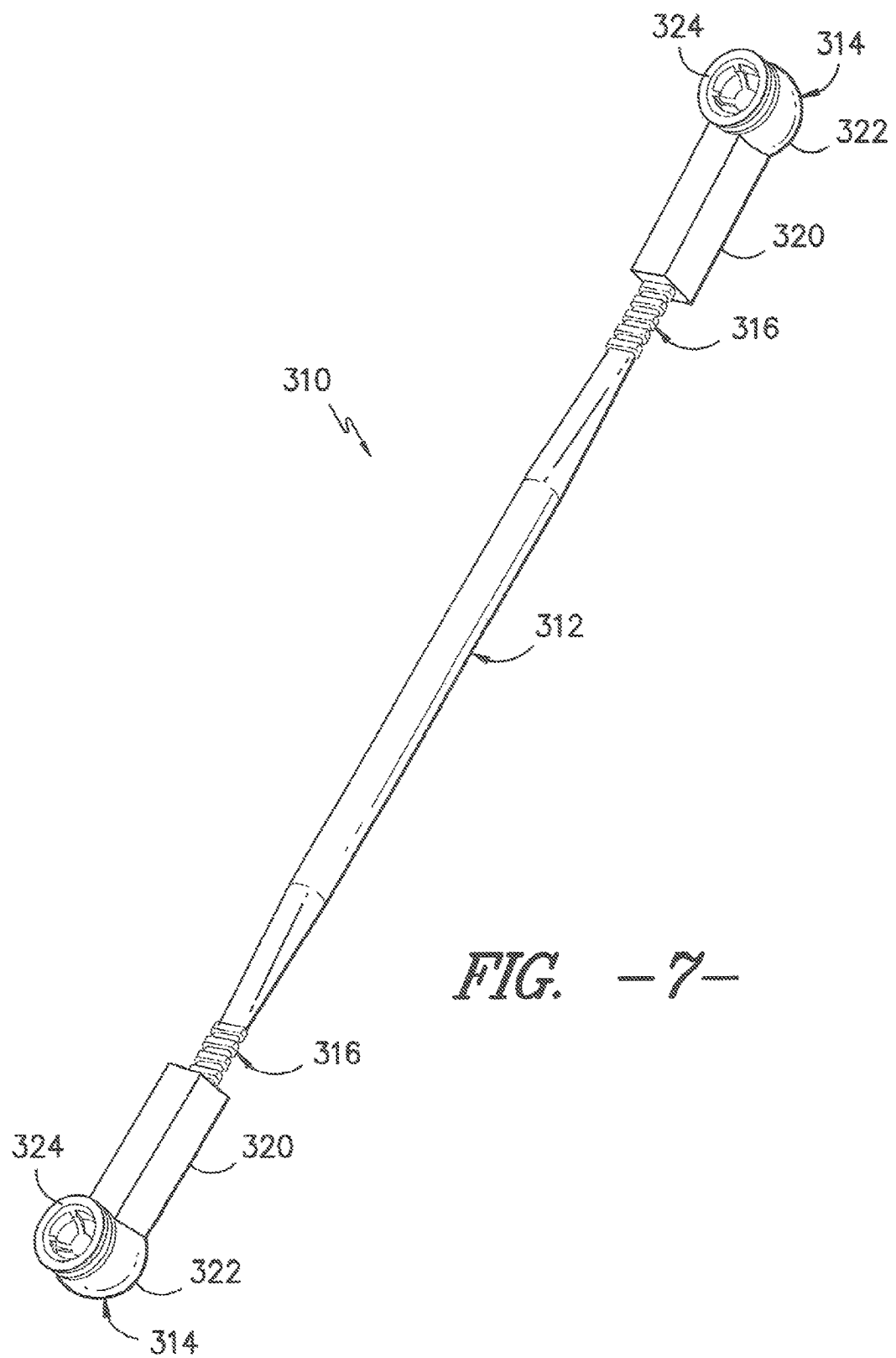
FIG. —7—

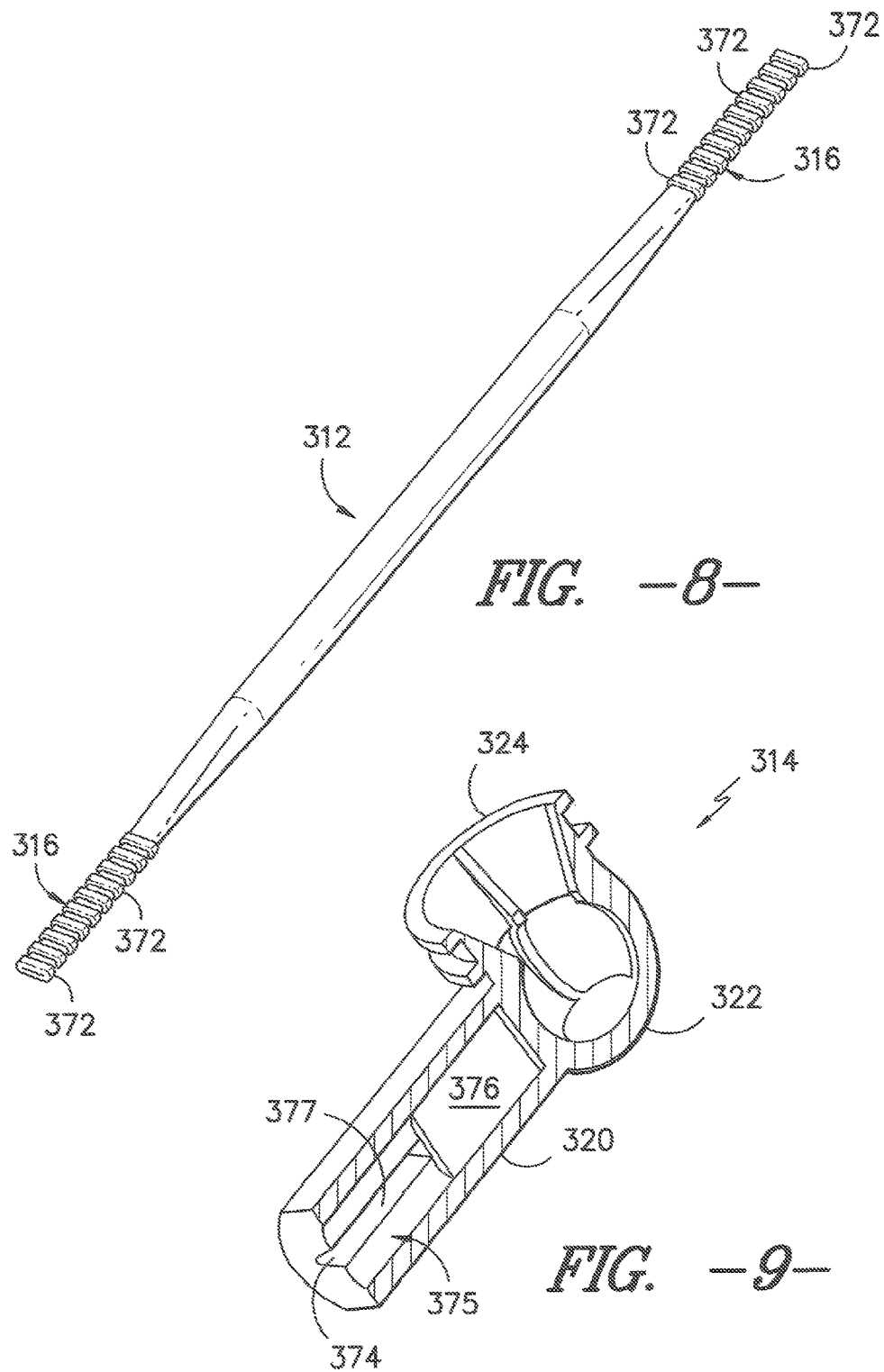

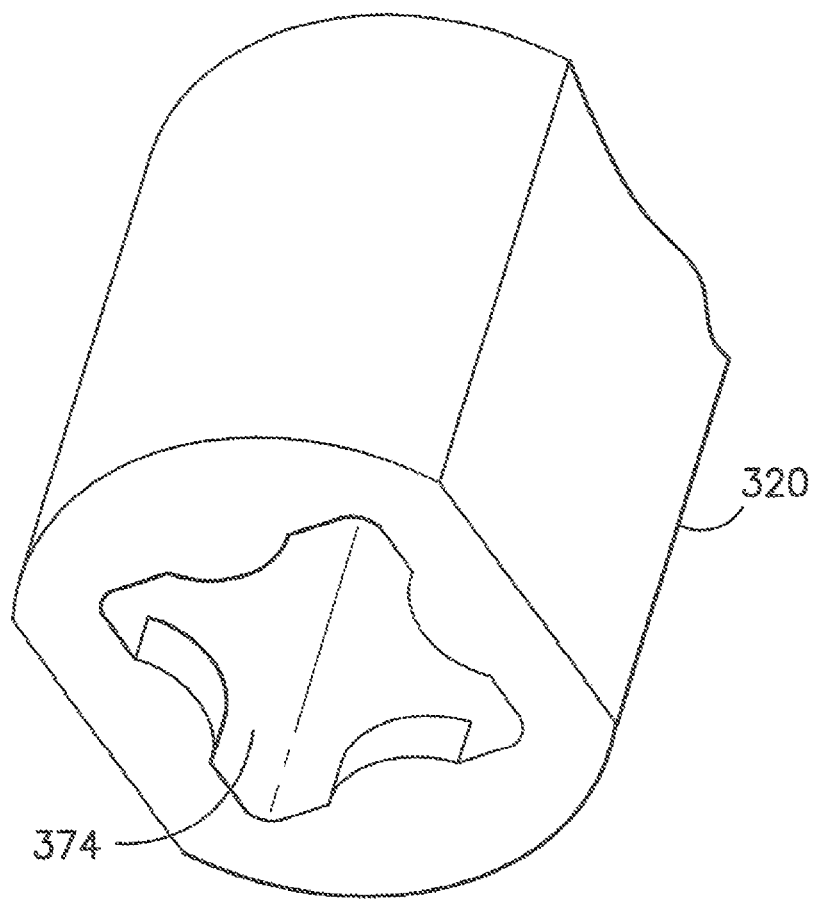
FIG. —10—

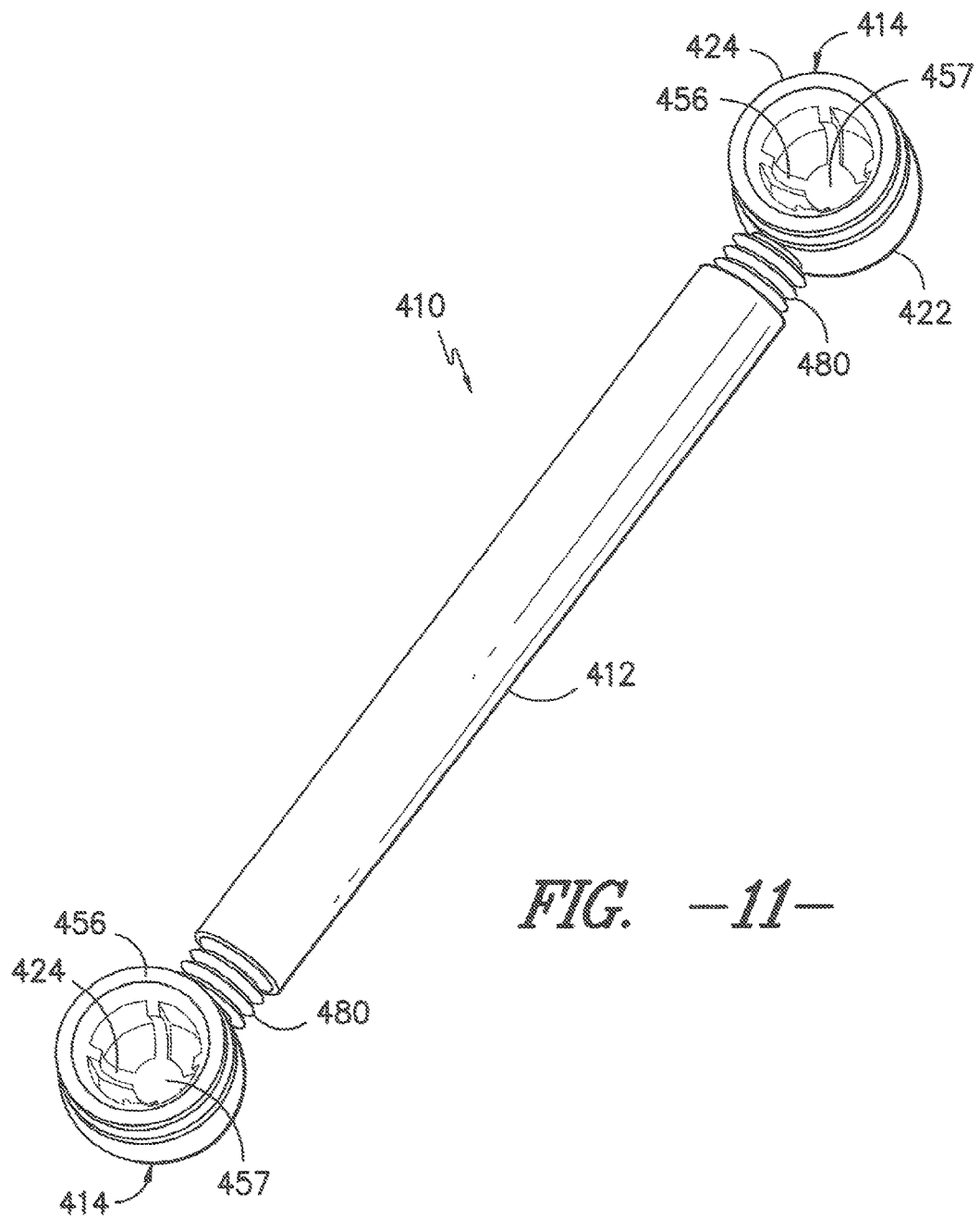
FIG. -11-

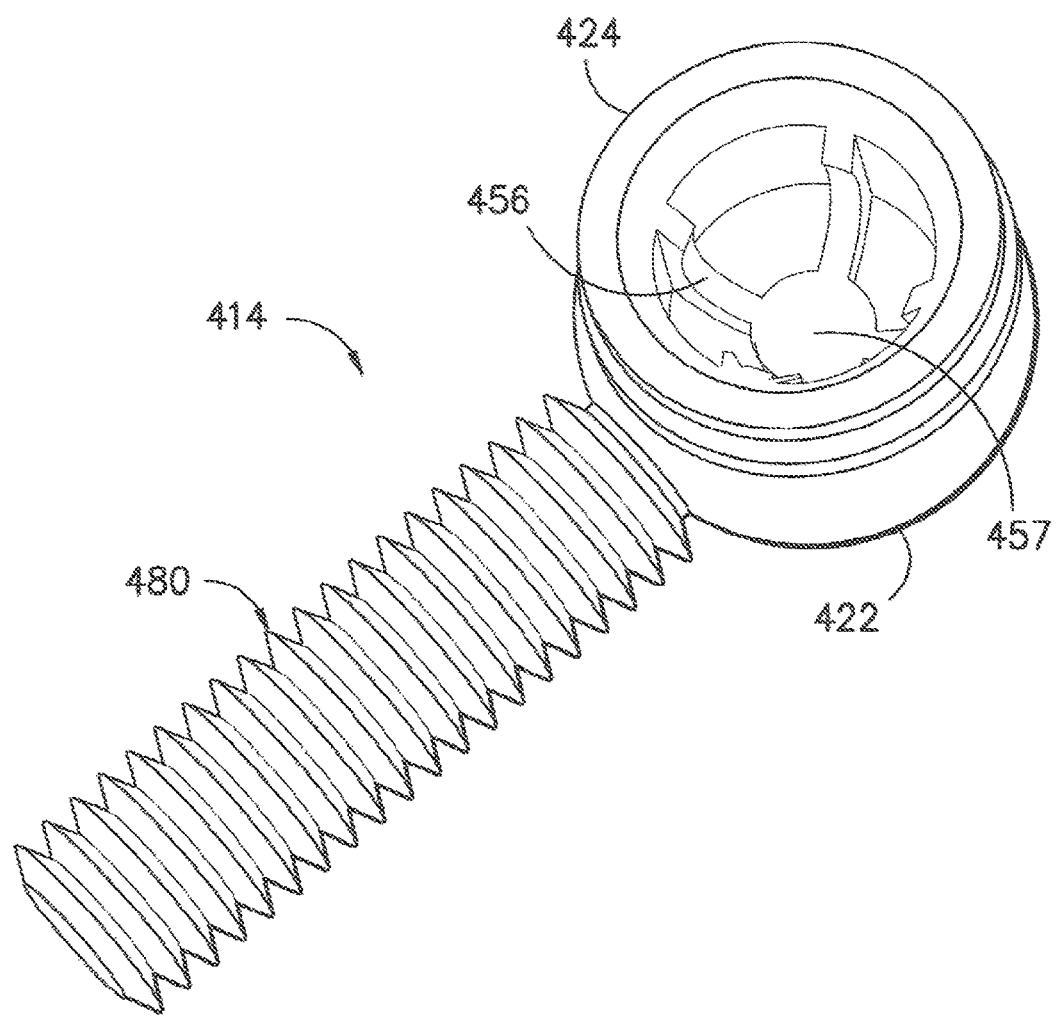
FIG. -12-

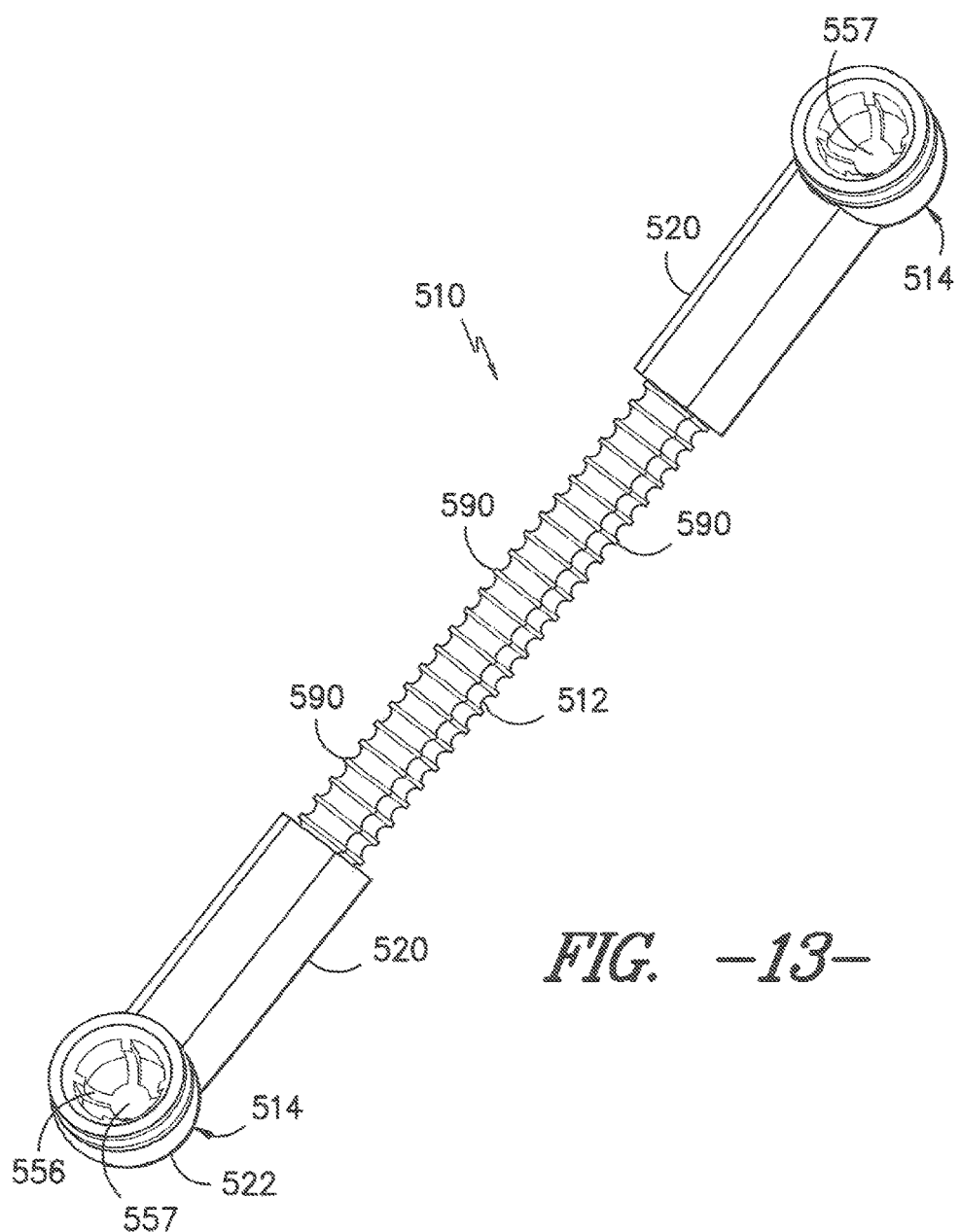
FIG. -13-

ADJUSTABLE LINKING ARM ASSEMBLY

CROSS-REFERENCE TO RELATED APPLICATION

This application is a National Phase of PCT/US2014/015448 filed Feb. 8, 2014 and claims the benefit of, and priority from, U.S. Provisional Application 61/766,985 filed Feb. 20, 2013. The contents of such provisional application and any other patent documents referenced in this application are hereby incorporated by reference in their entirety as if fully set forth herein.

TECHNICAL FIELD

The present disclosure relates generally to a linking arm assembly, and is more particularly directed to an adjustable linking arm assembly readily adapted for configuration to various sizes, and/or lengths and/or orientations so as to be adapted for use in a wide array of environments. The linking arm assembly may use a common set of components to achieve various configurations, thereby reducing the complexity associated with using size-specific components. By way of example only, a linking arm assembly in accordance with the present disclosure may find application as a vehicle ride height sensor linkage or the like. Such a linkage establishes a connection between the vehicle's moveable suspension and a sensor, such as a wheel sensor or the like, which provides position information to an electronic control unit. Of course, a linking arm assembly in accordance with the present disclosure may likewise find application in any number of other environments of use if desired.

BACKGROUND

In many operational environments one or more linking arm assemblies may be operatively connected to a structure for use in monitoring the position of that structure relative to a defined reference position. In many of these linking arm assemblies, a rod extends between a pair of socket heads or other attachment elements at either end of the rod. The attachment element at one end of the rod is attached to a ball stud or other engagement element at the structure to be monitored, and the attachment element at the other end is operatively connected to a reference structure or is allowed to articulate in a defined manner. The rod may include one or more sensors which monitor the relative positions of the ends. Changes in the spacing and/or the relative position of the ends can thus be monitored, thereby indicating changes in position. By way of example only, and not limitation, such linking arms may be used in conjunction with a vehicle computer to monitor headlight leveling, vehicle suspension height and the like. Of course, such assemblies may likewise be used for any number of other purposes as well.

One deficiency of prior linking arm assemblies has been the general lack of adaptability to a wide array of different uses. Thus, it has been typical to use a relatively large number of different configurations with pre-established sizes, lengths, and/or orientations to meet different needs. That is, past linking arm assemblies typically have been configured for specific environments of use and are not readily adjustable to adapt to significantly different environments of use.

SUMMARY OF THE DISCLOSURE

The present disclosure provides useful advantages and alternatives over the prior art by providing linking arm assemblies which are readily adaptable to assume a wide range of operative lengths and configurations using a small number of common components. Accordingly, linking arm assemblies consistent with the present disclosure may be adjusted for use in very different applications while using common components.

In accordance with one exemplary aspect, the present disclosure provides a variable length linking arm assembly adapted to receive and retain a ball stud. The linking arm assembly includes an elongated rod structure and at least a first socket head having a first socket cavity adapted to engage the ball stud. The first socket head is operatively connected to the rod structure. The assembly may optionally include at least a second socket head having a second socket cavity. The second socket head may be operatively connected to the rod structure at a position remote from the first socket head. The operative length of the linking arm assembly is variable over a range of lengths by adjustment of the relative position of the rod structure and the socket heads.

Other features and advantages of the disclosure will become apparent to those of skill in the art upon review of the following detailed description, claims and drawings.

BRIEF DESCRIPTION OF THE DRAWINGS

FIG. 1 is a schematic perspective view illustrating an exemplary embodiment of a linking arm assembly consistent with the present disclosure;

FIGS. 2 and 3 are schematic perspective views illustrating an exemplary socket head adapted to engage a ball stud for use in a linking arm assembly consistent with the present disclosure;

FIGS. 4 and 5 are schematic perspective views illustrating another embodiment of a linking arm assembly consistent with the present disclosure;

FIG. 6 is a schematic perspective view illustrating another exemplary embodiment of a linking arm assembly consistent with the present disclosure;

FIGS. 7-9 are schematic perspective views illustrating another exemplary embodiment of a linking arm assembly consistent with the present disclosure;

FIG. 10 is a schematic perspective view illustrating an exemplary profiled rod acceptance opening for use in a socket head sleeve segment in a linking arm assembly consistent with the present disclosure;

FIGS. 11 and 12 are schematic perspective views illustrating another exemplary embodiment of a linking arm assembly consistent with the present disclosure; and FIG. 13 is a schematic perspective view illustrating another exemplary embodiment of a linking arm assembly consistent with the present disclosure.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Reference will now be made to the drawings, wherein to the extent possible, like elements are designated by like reference numerals in the various views. FIG. 1, illustrates an embodiment of an exemplary adjustable linking arm assembly 10 consistent with the present disclosure. As illustrated, the exemplary linking arm assembly 10 may include a rod 12 of elongated construction formed of plastic, metal, ceramic, or other suitable material extending between a pair of socket heads 14 adapted to engage a ball stud or the like in a manner as will be described further hereinafter. By way of example only, the rod 12 may be electrolytically coated or zinc plated steel. The socket heads 14 may be molded as unitary structures from resilient materials such as thermoplastic polyurethane (TPU), rubber, or other similar material which is adapted to deform resiliently in response to applied forces. As shown, the rod 12 may include end segments 16 incorporating threads, rings, or other anti-pull-out elements adapted to matedly engage the interior of elongated cooperating sleeve segments 20 of the socket heads 14. In this regard, the end segments 16 of the rod 12 may incorporate anti-rotation threads such as those marketed under the trade designation BOSSCREW™ or the like incorporating indentions along the threads adapted to engage the polymer sleeve segments and to cause creep of the polymer as the threads are rotated during assembly. Such structures thereby require additional force for loosening and disengagement.

As illustrated, in accordance with one exemplary practice, the sleeve segments 20 of the socket heads 14 may have a substantially elongated construction with a length dimension of at least about 2.5 times the width dimension or greater. As will be appreciated, such extended lengths may promote substantial adjustability by facilitating insertion of the rod 12 to various depths as may be desired. Thus, the operative length of the linking arm assembly 10 may be readily adjusted by a user through controlled insertion of the rod 12 without the need to use a different rod or socket heads.

Referring now jointly to FIGS. 1-3, in the illustrated exemplary embodiment, each of the socket heads 14 may have a generally "L" shaped construction incorporating the sleeve segment 20 of open-ended construction extending away from a generally bowl-shaped socket cradle 22. In the illustrated construction, the socket heads 14 may also include a distal collar segment 24 of substantially hollow construction defining an insertion channel 25 oriented in substantially coaxial aligned relation to the rear of the socket cradle 22.

As illustrated, the socket heads 14 may be adapted to receive and retain ball studs 30 incorporating a ball structure 32 at a proximal end and an engagement structure 34 such as a threaded connection or the like at a distal end. In this regard, while the ball stud 30 in FIG. 2 is illustrated as having an engagement structure 34 in the form of a male thread, it is likewise contemplated that the engagement structure 34 may be another male or female connection element as may be desired.

As shown in FIG. 3, in one exemplary construction, the socket cradle 22 houses an interior socket cavity 40 adapted to receive and retain the ball structure 32 of a cooperating ball stud 30. In this arrangement, the ball structure 32 may be matedly inserted through the insertion channel 25 within the distal collar segment 24. An elastomeric sealing boot 44 of rubber, plastic, or the like may fit in sealing relation circumferentially about the distal collar segment 24 such that the sealing boot 44 and the insertion channel 25 within the collar segment 24 are in substantially coaxial relation. In the illustrated exemplary construction, the sealing boot 44 includes a substantially annular outer face 46 defining a stud acceptance opening 48 aligned with the insertion channel 25 and adapted to receive the proximal end of the ball stud 30. In this regard, the stud acceptance opening 48 may expand resiliently during insertion of the ball structure 32 and then rebound to sealingly surround the reduced diameter neck 36 inboard from the ball structure 32. As shown, a raised hollow nipple 50 of flexible character may surround the stud acceptance opening 48 to aid in forming a seal about the neck 36 following insertion of the ball stud. As will be appreciated, the sealing boot 44 acts to contain any lubricant within the socket cavity 40 while blocking debris from entering the joint.

As best seen in FIG. 3, in the illustrated exemplary construction, the socket cavity 40 may include an arrangement of flexible raised interior ribs 56 which are molded into the socket cavity and are adapted to press against the ball structure 32 during use. As shown, the interior ribs 56 may follow the contour of the bowl-shaped socket cavity 40 so as to extend both radially and axially within the interior of the socket cavity. A substantially flat, flexible raised hub 57 may be molded into the back of the socket cavity 40 in substantial alignment with the insertion channel 25 such that the interior ribs 56 and the raised hub 57 form a hub and spoke orientation. Pockets 58 defining depressions between the interior ribs 56 may act to retain lubricant and to prevent debris from contacting the ball surface. As will be appreciated, the flexible socket cradle 22 and flexible interior ribs 56 may facilitate ease of ball insertion during assembly. Moreover, the flexible interior ribs 56 may provide a level of precompression to establish torque at levels to achieve desired performance and durability.

As will be understood, a linking arm assembly 10 in accordance with the present disclosure may be readily adapted to a wide variety of environments by inserting the rod 12 to various depths within the sleeve segments 20 thereby changing the effective length of the assembly. It is contemplated that the effective length also may be adjusted by altering the construction of the rod and/or the engagement between the rod 12 and the socket heads 14.

FIGS. 4 and 5 illustrate another exemplary embodiment of a linking arm assembly 110 consistent with the present disclosure wherein elements described previously are designated by corresponding reference numerals increased by 100. As shown, in this exemplary embodiment, the socket heads 114 may be integrally molded with elongate body structures 160 having a contoured face 162 including an arrangement of serrated teeth 163 across the surface of the contoured face. As shown, serrated teeth 163 may project generally in the same direction as the insertion channel 125 leading into the interior of the socket cradle 122. As best seen in FIG. 5, the elongate body structures 160 may cooperatively mesh in overlapping face-to-face relation to define a multi-piece the rod structure 112 extending between the socket heads 114. In this regard, the serrated teeth 163 across each surface may mate together to form an anti-slip arrangement. As will be appreciated, the face-to-face relation between the substantially polygonal body structures blocks undesired relative rotation.

In the illustrated exemplary construction, the elongate body structures 160 each may have a generally "T" shaped cross section defining a ledge 164 disposed along lateral sides of the body structures 160 below the contoured face 162. The elongate body structures 160 may also include integral or attachable snap fasteners 165 arranged along the lateral sides. These snap fasteners 165 may be formed from resilient plastic or like material and may include hooking elements 166 at their free ends adapted to snap behind the ledges 164 of the opposing elongate body structure 160 so as to maintain the desired meshed relation when the elongate body structures are pressed together. As best seen in FIG. 4, in the illustrated exemplary construction, the hooking elements 166 may include chamfered outer faces 167 which extend to shoulder edges 168. In use, the chamfered outer faces 167 of the hooking elements 166 are adapted to ride over the ledges 164 of the opposing elongate body structure 160 until the shoulder edges 168 snap behind the ledges 164 to establish a secure connection. As will be appreciated, in this embodiment, the operative length of the linking arm assembly 110 may be readily adjusted by a user by disengaging the snap fasteners 165 and repositioning the elongate body structures 160 relative to one another as desired. Multiple different operative lengths thereby may be achieved.

FIG. 6 illustrates another exemplary embodiment of a linking arm assembly 210 consistent with the present disclosure wherein elements described previously are designated by corresponding reference numerals increased by 200. As shown, in this exemplary embodiment, the socket heads 214 may be operatively connected to spring-biasing brackets 270 adapted to snap in compressing relation circumferentially about the rod 212. In this regard, while the rod 212 is illustrated as having a substantially circular cross-section, it is likewise contemplated that the rod 212 may have a contoured profile with protrusions and/or with one or more flat surfaces to further aid in preventing rotation. As illustrated, in this embodiment the socket heads 214 may be mounted in virtually any desired orientation along the length of the rod 212. Multiple different operative lengths thereby may be achieved.

FIGS. 7-9 illustrate another exemplary embodiment of a linking arm assembly 310 consistent with the present disclosure wherein elements described previously are designated by corresponding reference numerals increased by 300. As shown, in this exemplary embodiment, the rod 312 includes a pair of flattened end segments 316 incorporating a multiplicity of spaced-apart ribs 372 extending circumferentially about the end segments. As illustrated, the flattened end segments 316 are characterized by a width dimension which is substantially greater than the thickness dimension. It may be seen that each of the flattened end segments 316 may be inserted into an access opening 374 at the end of the sleeve segment 320. As best seen in FIG. 10 the access opening 374 may be configured to facilitate insertion of the end segments 316 in pre-defined orientations relative to the sleeve segment 320. That is, the end segments may only be inserted in certain pre-defined orientations.

Referring now to FIG. 9, it may be seen that in the exemplary linking arm assembly 310, the interior of the sleeve segments 320 may define a stepped channel configured to permit insertion of the end flattened end segments 316 to various predefined depths depending on the orientation of insertion. As shown, in the exemplary construction the stepped channel 375 may include a primary channel segment 376 which extends to an extended depth along the length of the sleeve segment 320 and a secondary channel segment 377 (only one half shown) disposed transverse to the primary channel segment. The secondary channel segment 377 extends only to a shortened depth within the sleeve segment 320.

During assembly, the flattened end segments may be inserted into the sleeve segments so as to be aligned with either the primary channel segment 376 or with the secondary channel segment 377. Insertion may then proceed until blockage is encountered. Thus, the operative length of the linking arm assembly 310 may be adjusted by changing the rotational orientation between the rod 312 and the socket heads 314.

FIGS. 11 and 12 illustrate another exemplary embodiment of a linking arm assembly 410 consistent with the present disclosure wherein elements described previously are designated by corresponding reference numerals increased by 400. As shown, in this embodiment, the socket heads 414 may include an elongated ridge surface nipple 480 adapted for press-fit insertion into end openings in the rod 412. In this exemplary construction, the ridge surface nipples may deform or crush during press-fit insertion into complementary openings at the ends of the rod 412, thereby locking the socket heads in place. The nipples 480 may be hollow along their length if desired to facilitate such deformation. The operative length of the linking arm assembly 410 may thus be established by inserting the nipples 480 to a defined degree.

FIG. 13 illustrates yet another exemplary embodiment of a linking arm assembly 510 consistent with the present disclosure wherein elements described previously are designated by corresponding reference numerals increased by 500. As shown, in this embodiment, the rod 512 may include an arrangement of ribs 590 disposed circumferentially about a polygonal body to block rotation. The rod 512 may be inserted into acceptance openings at the proximal ends of the socket head sleeve segments 520. If desired, such acceptance openings may be profiled to include a pattern of scalloped indentures and protrusions about the perimeter to lockingly engage the ribs 590 following insertion. The operative length of the linking arm assembly 510 may be established by inserting the nipples rod 512 to a defined degree with withdrawal blocked by engagement between the ribs 590 and the socket head sleeve segments 520.

While various spatial and directional terms, such as upper, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Of course, variations and modifications of the foregoing are within the scope of the present disclosure. It is to be understood that the disclosure herein extends to all alternative combinations of two or more of the individual features mentioned or evident from the text and/or drawings. All of these different combinations constitute various alternative aspects of the present disclosure. The embodiments described herein will enable others skilled in the art to utilize the contents of the disclosure. The claims are to be construed to include alternative embodiments to the fullest extent permitted by the prior art.

What is claimed is:

1. A variable length linking arm assembly adapted to receive and retain a ball stud, the assembly comprising: an elongated rod structure; and at least a first socket head including a socket cavity adapted to engage the ball stud, said first socket head being operatively connected to the rod structure, and wherein an operative length of the linking arm assembly between the socket cavity and an end of the rod structure remote from the first socket head is variable over a range of lengths by adjustment of the relative position of the rod structure and the first socket head wherein the first socket head is a molded unitary structure formed from a polymer and wherein the rod structure comprises a threaded end segment incorporating anti-rotation threads adapted to matedly engage a portion of the first socket head and cause creep of the polymer as the threads are rotated during assembly.

2. The variable length linking arm assembly as recited in claim 1, wherein the first socket head includes an elongated sleeve segment extending away from a socket cradle, and wherein the threaded end segment is adapted to matedly engage the interior of the sleeve segment.

3. A variable length linking arm assembly adapted to receive and retain a ball stud, the assembly comprising:
an elongated rod structure;
a first socket head including a first socket cavity adapted to engage the ball stud, said first socket head being operatively connected to the rod structure; and
at least a second socket head including a second socket cavity, said second socket head being operatively connected to the rod structure at a position remote from the first socket head, and wherein an operative length of the linking arm assembly between the first socket cavity and the second socket cavity is variable over a range of lengths by adjustment of the relative position of the rod structure and relative to each of the socket heads, wherein the first socket head and the second socket head each include an elongated sleeve segment extending away from a socket cradle, and wherein the rod structure comprises threaded end segments adapted to matedly engage the interiors of the sleeve segments, the threaded end segments each incorporating anti-rotation threads adapted to cause creep of a polymer forming the sleeve segments as the threads are rotated during assembly.

4. A variable length linking arm assembly adapted to receive and retain a ball stud, the assembly comprising: an elongated rod structure comprising a first end segment and a second end segment, the end segments each having a plurality of spaced-apart surface ribs; a first socket head of unitary molded construction including a first socket cavity within a first socket cradle adapted to engage a first ball stud, the first socket head including a first sleeve segment extending away from the first socket cradle, the first end segment of the rod structure adapted to matedly engage an interior channel within the first sleeve segment by press-fit insertion to a variable depth; and at least a second socket head of unitary molded construction including a second socket cavity within a second socket cradle adapted to engage a second ball stud, the second socket head including a second sleeve segment extending away from the socket cradle, the second end segment of the rod structure adapted to matedly engage an interior channel within the second sleeve segment by press-fit insertion to a variable depth said second socket head being operatively connected to the rod structure at a position remote from the first socket head, and wherein an operative length of the linking arm assembly between the first socket cavity and the second socket cavity is variable over a range of lengths by adjustment of the relative position of the rod structure and the socket heads.

5. The variable length linking arm assembly as recited in claim 4, wherein at least the first sleeve segment includes an acceptance opening with a perimeter profile of scalloped indentures and protrusions adapted to lockingly receive the first end segment of the rod structure.

6. The variable length linking arm assembly as recited in claim 4, wherein at least the first end segment of the rod structure is a flattened end segment and the interior channel within at least the first sleeve segment includes a primary slotted channel segment adapted to receive the flattened end segment and extending to a first depth within the first sleeve segment and a secondary slotted channel segment adapted to receive the flattened end segment and extending to a second depth within the first sleeve segment, the second depth being less than the first depth, the secondary slotted channel being oriented transverse to the primary slotted channel.

7. The variable length linking arm assembly as recited in claim 6, wherein the flattened end segment includes a plurality of spaced-apart ribs disposed circumferentially at least partially about the flattened end segment at positions along the length of the flattened end segment.

8. The variable length linking arm assembly as recited in claim 4, wherein the rod structure is substantially polygonal along its length, the rod structure comprising a plurality of spaced-apart ribs disposed circumferentially at least partially about a flattened end segment at positions along the length of the rod structure.

9. The variable length linking arm assembly as recited in claim 4, wherein the first end segment and the second end segment each are flattened end segments adapted for press-fit insertion into interior channels of stepped construction within the sleeve segments, the interior channels each including a primary slotted channel segment adapted to receive a flattened end segment of the rod structure and extending to a first depth within the sleeve segment and a secondary slotted channel segment adapted to receive a flattened end segment of the rod structure and extending to a second depth within the sleeve segment, the second depth being less than the first depth, the secondary slotted channel being oriented transverse to the primary slotted channel.

10. The variable length linking arm assembly as recited in claim 9, wherein the flattened end segments each include a plurality of spaced-apart ribs disposed circumferentially at least partially about the flattened end segments at positions along the length of the flattened end segments.

11. The variable length linking arm assembly as recited in claim 10, wherein the rod structure is substantially polygonal along its length.

* * * * *